US006957183B2

(12) United States Patent
Malayath et al.

(10) Patent No.: US 6,957,183 B2
(45) Date of Patent: Oct. 18, 2005

(54) METHOD FOR ROBUST VOICE RECOGNITION BY ANALYZING REDUNDANT FEATURES OF SOURCE SIGNAL

(75) Inventors: Narendranath Malayath, San Diego, CA (US); Harinath Garudadri, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 512 days.

(21) Appl. No.: 10/104,178

(22) Filed: Mar. 20, 2002

(65) Prior Publication Data

US 2003/0182115 A1 Sep. 25, 2003

(51) Int. Cl.[7] ............................................. G10L 15/00
(52) U.S. Cl. ...................... 704/246; 704/236; 704/243
(58) Field of Search ................................. 704/236, 243, 704/246

(56) References Cited

U.S. PATENT DOCUMENTS

| | | | | |
|---|---|---|---|---|
| 5,381,512 A | * | 1/1995 | Holton et al. ............ | 704/200.1 |
| 5,414,796 A | | 5/1995 | Jacobs et al. | |
| 5,450,522 A | | 9/1995 | Hermansky et al. | |
| 5,517,558 A | * | 5/1996 | Schalk ..................... | 379/88.02 |
| 5,655,057 A | * | 8/1997 | Takagi ..................... | 704/233 |
| 5,764,853 A | | 6/1998 | Watari et al. ............. | 395/252 |
| 6,671,404 B1 | * | 12/2003 | Kawatani et al. .......... | 382/190 |

FOREIGN PATENT DOCUMENTS

EP 0192898 9/1986

OTHER PUBLICATIONS

Gemello, R. et al: "Multi–Source Nerual Networks for Speec Recognition", Neural Networks, 1999. IEEE, Jul. 10, 1999, pp. 2946–1949.

Finke, M. et al: The Karlsruhe–Verbmobil Speech Recognition Engine:. Acoustics, Speech, and Signal Processing, 1997. IEEE International Conference on Munich, Germany, Apr. 21, 1997, pp. 83–86.

Kuo–Hwei You, et al: "Robust Features Derived from Temporal Trajectory Filtering for Speech Recognition Under The Corruption of Additive and Convolutional Noises", Acoustics, Speech and Signal Processing, 1998. IEEE International Conference On Seattle, WA, May 12, 1998. pp. 577–580.

Sharma, S. et al: "Feature Extraction Using Non–linear Transformation for Robust Speech Recognition On the Aurora Database", ICASSP 2000, vol. 2, Jun. 5, 2000, pp. 1117–1120.

* cited by examiner

*Primary Examiner*—Daniel Abebe
(74) *Attorney, Agent, or Firm*—Philip Wadsworth; Charles D Brown; George C. Pappas (57) ABSTRACT

A method for processing digitized speech signals by analyzing redundant features to provide more robust voice recognition. A primary transformation is applied to a source speech signal to extract primary features therefrom. Each of at least one secondary transformation is applied to the source speech signal or extracted primary features to yield at least one set of secondary features statistically dependant on the primary features. At least one predetermined function is then applied to combine the primary features with the secondary features. A recognition answer is generated by pattern matching this combination against predetermined voice recognition templates.

41 Claims, 5 Drawing Sheets (PRIOR ART) FIG. 1

METHOD FOR ROBUST VOICE RECOGNITION BY ANALYZING REDUNDANT FEATURES OF SOURCE SIGNAL

BACKGROUND OF THE INVENTION

1. Field of the Invention

The present invention relates to voice recognition techniques and circuits, and more particularly, to a system for more accurate and noise-tolerant robust voice recognition by analyzing redundant features of a source signal.

2. Description of the Related Art

Various signal processing techniques have been developed for analyzing digitized speech signals in order to recognize the underlying content of such speech. Once recognized, this content can then be used to control a handheld telephone, computer, household appliance, or other device. Some such known techniques employ short-time Fourier spectra or "spectrogram" of a speech signal, which are computed using windowed Fourier transforms as explained more fully in Rabiner et al., *Fundamentals of Speech Recognition*, the entirety of which is incorporated herein by reference.

Figure 1:
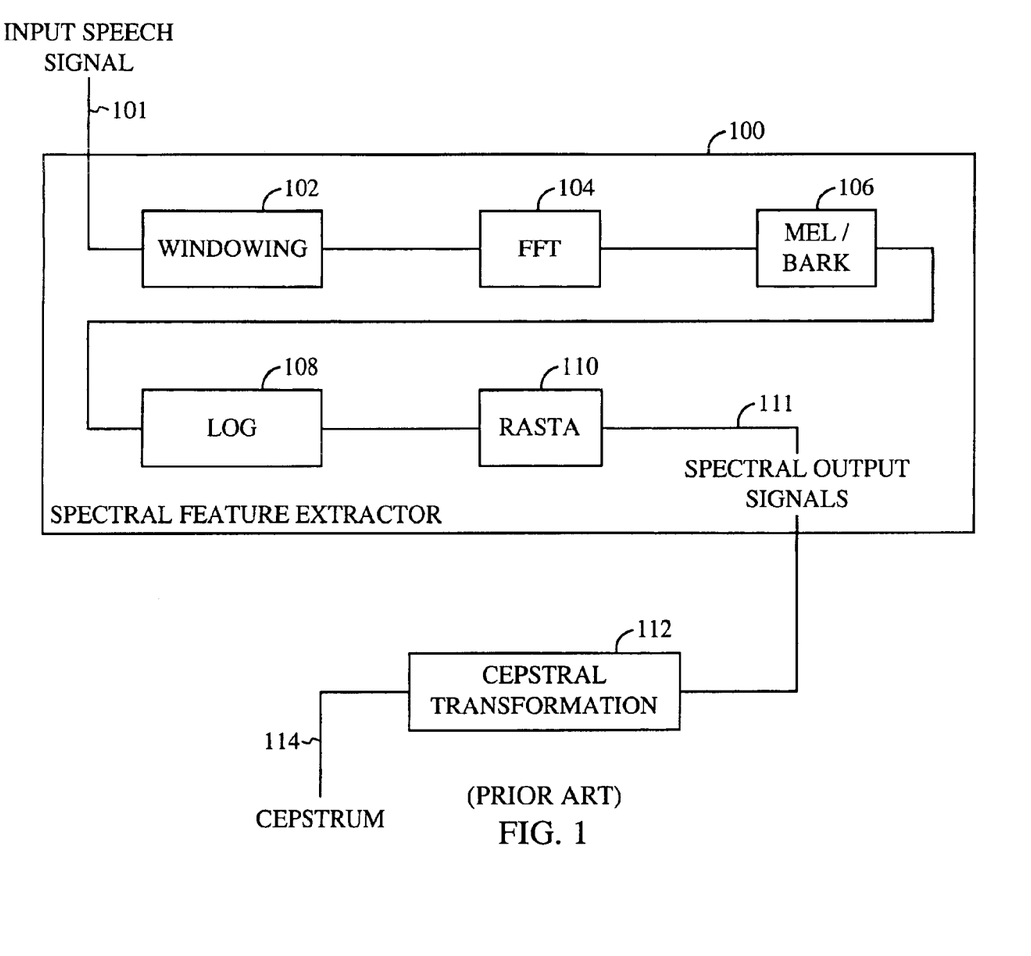
FIG. 1 is a block diagram of the hardware components and interconnections of known spectral and cepstral processing systems.

FIG. 1 shows one known spectral feature extractor 100 for spectral analysis, which includes stages of windowing 102, FFT 104, MEL/BARK filtering 106, Log 108, and RASTA filtering 110. A digitized input speech signal 101 is fed into the windowing stage 102, which divides the input signal into smaller sized segments of appropriate duration, such as 20 milliseconds. The FFT stage 104 performs a Fast Fourier Transform to windowed segments output by the stage 102. The MEL/BARK stage 106 performs warping of the linear frequency scale to a different scale, so that the resolution for lower frequencies is greater than that for higher frequencies. The resolution on the frequency scale becomes progressively coarser from low frequencies to high frequencies in the hearing range. MEL scale and BARK scale are two known transformations that result in the above frequency warping. These two (and some variations) are commonly used in speech recognition. The Log stage 108 takes the Logarithm of the input number, and more particularly, the log of each MEL/BARK transformed spectral value that has been computed. The foregoing stages 102–108 are described in various known publications, with one example being the above-cited text Rabiner et al., *Fundamentals of Speech Recognition*.

The RASTA stage 110 serves to filter the output of the Log stage 108 by a predefined bandpass filter. For example, if there are sixteen BARK numbers, there will be sixteen filters operating on each of the bark bands. The RASTA stage 110 may be implemented by any known RASTA processing technique, with one example being described in U.S. Pat. No. 5,450,522 entitled "Auditory Model for Parameterization of Speech" to Hermansky et al., the entirety of which is incorporated herein.

The output of the spectral feature extractor 100 comprises spectral output signals 111, which are thereafter processed by various subsequent techniques (not shown) to yield a "recognition answer" that gives the predicted content of the input speech signal. Recognition answers based on such spectral output signals 111 provide decent accuracy in low noise environments. Advantageously, degradation of their accuracy occurs slowly with decreasing signal-to-noise ratios. Spectral output signals can be further processed in various ways. For instance, one approach further processes the spectral output signals 111 by a cepstral transformation 112 to yield cepstral output signals 114. One type of cepstral transformation 112, for example, utilizes a discrete cosine transform (DCT) followed by a dimensionality reduction. Broadly, "cepstrum" is explained as the inverse Fourier transform of the logarithm of the power spectrum of a signal, as further discussed in the following references, hereby incorporated by reference in their entirety: A. V. Oppenheim and R. W. Schafer, *Discrete-Time Signal Processing*, J. R. Deller, Jr., J. G. Proakis and J. H. L. Hansen, *Discrete-Time Processing of Speech Signals*, and L. R. Rabiner and R. W. Schafer, *Digital Processing of Speech Signals*.

In systems where the cepstrum 114 is calculated, the cepstrum (rather than the spectrum 111) is processed by statistical modeling techniques to yield a recognition answer. One benefit of basing recognition answers upon cepstral output signals 114 is that they provide more accurate voice recognition at low levels of noise. However, as noise increases, the error rate increases rapidly for these systems. Therefore, neither spectral nor cepstral voice recognition systems are entirely adequate for applications that could potentially encounter a wide range of noise levels.

SUMMARY OF THE INVENTION

Broadly, the present invention concerns a method for processing digitized speech signals for voice recognition. Unlike conventional approaches, which seek compactness and simplicity of operation by removing redundant features of input speech prior to recognition, the present invention purposefully retains and analyzes redundant features of a source signal in order to perform voice recognition accurately in a variety of acoustic environments. A primary transformation is applied to a digitized source speech signal to extract primary features therefrom. One example is a spectral transformation applied to extract spectral features. Each of at least one secondary transformation is applied to the source speech signal or extracted spectral features to yield at least one set of secondary features. Each secondary transformation is designed to yield data containing some information that is already present in the extracted primary features. At least one predetermined function is then utilized to combine the primary features with the secondary features. A recognition answer is generated by pattern matching this combination against a predetermined set of voice recognition templates.

The invention affords its users with a number of distinct advantages. Chiefly, the invention provides accurate voice recognition with increasing levels of noise without sacrificing performance in low noise environments. This differs from conventional cepstral voice recognition systems, where performance rapidly drops with increasing noise, and also differs from conventional spectral voice recognition systems, where performance degrades more slowly with increasing noise with the tradeoff of some performance in low noise environments. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Overall Structure

Figure 2:
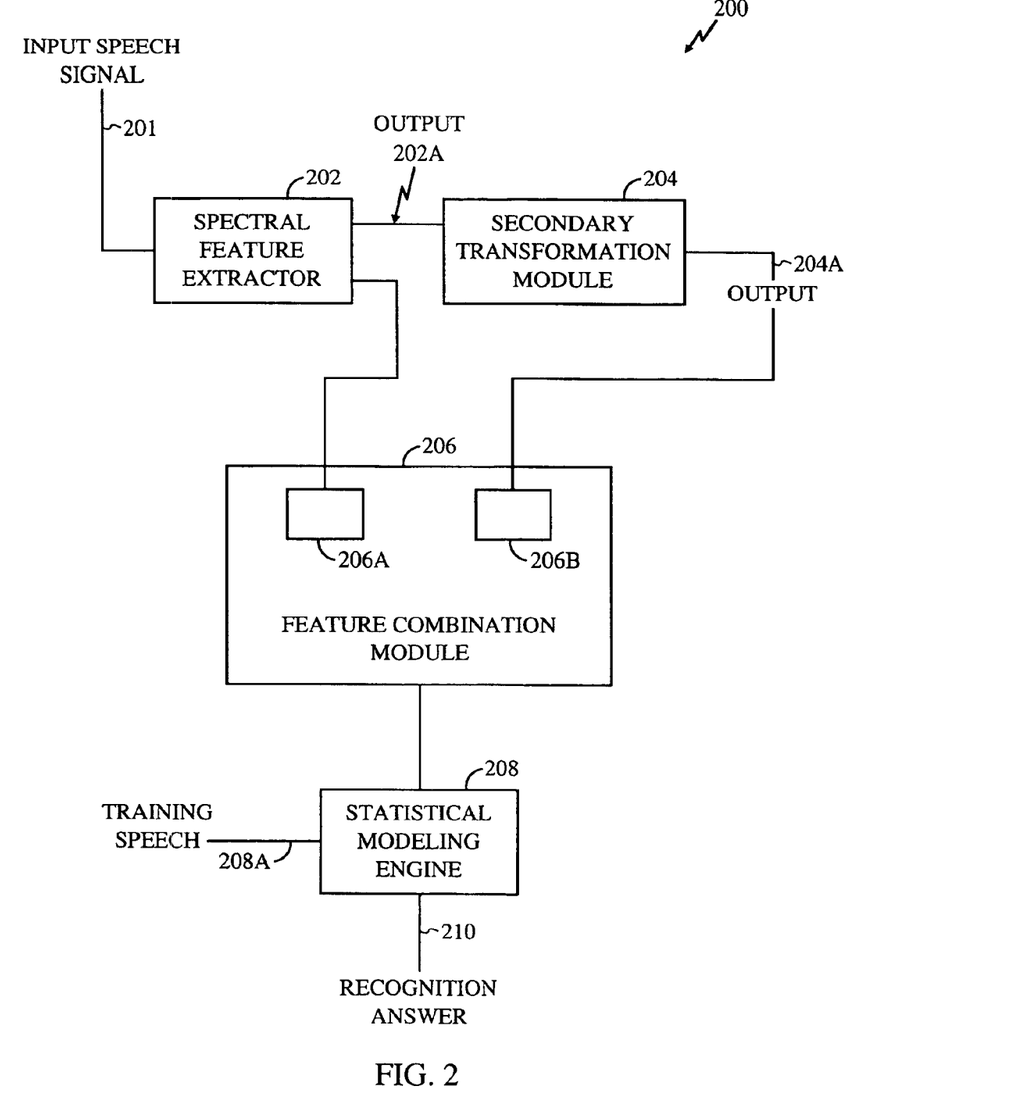
FIG. 2 is a block diagram of the hardware components and interconnections of one embodiment of voice recognition system.

One aspect of the invention concerns a voice recognition system, which may be embodied by various hardware components and interconnections, with one example being described by the voice recognition system 200 as shown in FIG. 2. The system 200 serves to process an input speech signal 201, which comprises a digitized speech signal. Optionally, the system 200 may include a digital-to-analog converter (DAC) to digitize analog input speech signals. The input speech signal 201 is fed to a spectral feature extractor 202, which comprises circuitry for extracting spectral features from the input speech signal 201. As one example, the extractor 202 may be embodied by components similar to the spectral feature extractor 100 shown in FIG. 1.

Output 202a of the extractor 202 comprises one or more spectral output signals, such as a spectral feature vector. The output 202a is directed to a secondary transformation module 204. The secondary transformation module 204 applies a predetermined function in order to provide a secondary output 204a. In the illustrated example, the module 204 applies a cepstral transformation, in which case the secondary output 204a comprises a set of cepstral vectors. The module 204's secondary feature signals 204a are directed to a feature combination module 206. As an alternative to the foregoing embodiment, where the secondary transformation module 204 receives output 202a of the extractor 202, the module 204 may instead receive the original input speech signal 201. In still another embodiment, there may be multiple secondary transformation modules 204, each applying a different function to the input speech signal 201 or spectral output 202a.

In any case, the foregoing description of spectral and cepstral features is merely exemplary, and the scope of the present disclosure nonetheless contemplates a variety of different primary and secondary transformations (not necessarily spectrum and cepstrum). As an example, the spectral feature extractor 202 and its spectral features 202a may be represented by any appropriate primary feature extractor 202 performing a first or higher order transformation to create a time-frequency representation of the input speech signal. Some examples include a spectral transformation, wavelet transformation, modulation spectrum, cumulants, etc.

Each secondary transformation may be implemented by a discrete cosine transform (producing cepstrum), principal component transform, or other projection of the primary features into another known or user-defined space. The secondary features may be produced mathematically, empirically, or by another means. In any case, each set of secondary features is "statistically dependent" upon the primary features, meaning that the secondary features are related to the primary features by mathematical function. In other words, it is possible to derive the secondary features by applying a mathematical function to the primary features. The secondary features, for instance, may be related from the primary features by correlation (including but not limited to addition, subtraction, multiplication by coefficients and adding, or another combination), nonlinear processing, or another technique. The primary features may, or may not, be mathematically reproducible from the secondary features. As one example, then, ceptstral features of the module 204 are statistically dependent on the spectral features of the extractor 202, and in fact, the illustrated cepstral vectors are derived by mathematically transforming the spectral vectors using cepstrum. Hence, outputs 202a, 204a contain redundant information regarding the input speech signal 201.

Unlike conventional voice recognition systems, where spectral or other primary output signals are not used except for further downstream (serial) processing, the spectral output signals 202a are separately analyzed apart from their use in the secondary transformation 204. Namely, the output signals 202a are fed directly to the feature combination module 206 for analysis.

The module 206 combines the spectral output signals 202a and the secondary output signals 204a. This combination may occur in various ways. As one example, the signals 202a, 204a may be combined by concatenation, linear discriminate analysis (LDA), principal component transform (PCT), or another function applied to both outputs 202a, 204a together. In a different embodiment, the module 206 may include processing subcomponents 206a, 206b that separately modify one or both of the signals 202a, 204a after which the module 206 combines the signals 202a, 204a as modified. If more than one secondary transformation 204 is performed, the module 206 may include an equal number of components 206b. Each subcomponent 206a, 206b may perform various functions, such as scaling (i.e., multiplying) its input signal by a fixed or variable coefficient, changing the exponent of the input signal, multiplying the input signal by itself one or more times (self-multiplying), or another one or more linear or nonlinear processes. In this embodiment, the modified signals are then combined using one of the foregoing techniques, e.g., concatenation, LDA, PCT, etc.

As mentioned above, there may be multiple secondary transformation modules 204, each of which receives an input signal such as the input signal 201 or the output 202a of the extractor 202. In such embodiment, the feature combination module 206 still operates to combine spectral feature signals with secondary transformation output signals, although the secondary transformation output signals come from multiple different modules 204.

The feature combination module 206 feeds its output to a statistical modeling engine 208, also referred to as a "recognizer" or a "pattern matching" unit. The engine 208, which may be implemented by a number of known techniques, produces an output comprising a recognition answer 210. The recognition answer 210 constitutes the system 200's estimation of the meaning of the input speech signal 201. The engine 208 includes a training input 208a for receiving input that trains the engine 208 to recognize certain model or sample speech patterns. As one particular example, the engine 208 may cross-reference the output of the module 206 in a lookup table to obtain the represented meaning of the input speech signal 201, i.e., its "answer."

Exemplary Digital Data Processing Apparatus

As mentioned above, data processing entities such as the extractor 202, secondary transformation module(s) 204, feature combination module 206, statistical modeling engine 208, and the like may be implemented in various forms. As one example, each of these components (or two or more components collectively) may be implemented by a digital data processing apparatus, as exemplified by the hardware components and interconnections of the digital data processing apparatus 300 of FIG. 3.

Figure 3:
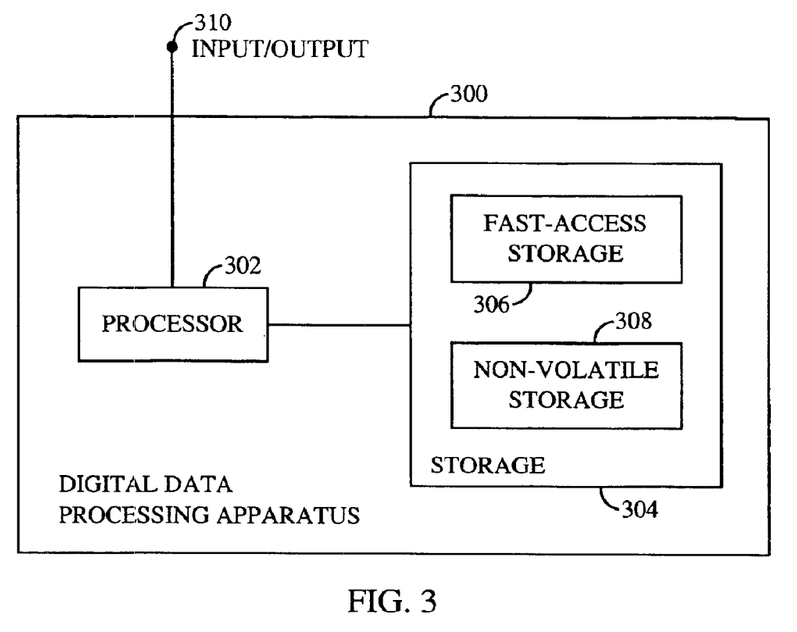
FIG. 3 is a block diagram of a digital data processing machine.

The apparatus 300 includes a processor 302, such as a microprocessor, personal computer, workstation, or other processing machine, coupled to storage 304. In the present example, the storage 304 includes a fast-access storage 306, as well as nonvolatile storage 308. One example of the fast-access storage 306 is random access memory ("RAM"), used to store the programming instructions executed by the processor 302. The nonvolatile storage 308 may comprise, for example, battery backup RAM, EEPROM, one or more magnetic data storage disks such as a "hard drive", a tape drive, or any other suitable storage device. The apparatus 300 also includes an input/output 310, such as a line, bus, cable, electromagnetic link, or other means for the processor 302 to exchange data with other hardware external to the apparatus 300.

Despite the specific foregoing description, ordinarily skilled artisans (having the benefit of this disclosure) will recognize that the apparatus discussed above may be implemented in a machine of different construction, without departing from the scope of the invention. As a specific example, one of the components 306, 308 may be eliminated; furthermore, the storage 304, 306, and/or 308 may be provided on-board the processor 302, or even provided externally to the apparatus 300.

Logic Circuitry

In contrast to the digital data processing apparatus discussed above, a different embodiment of the invention uses logic circuitry instead of computer-executed instructions to implement one or all components of the system 200. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Wireless Telephone Application

Figure 4:
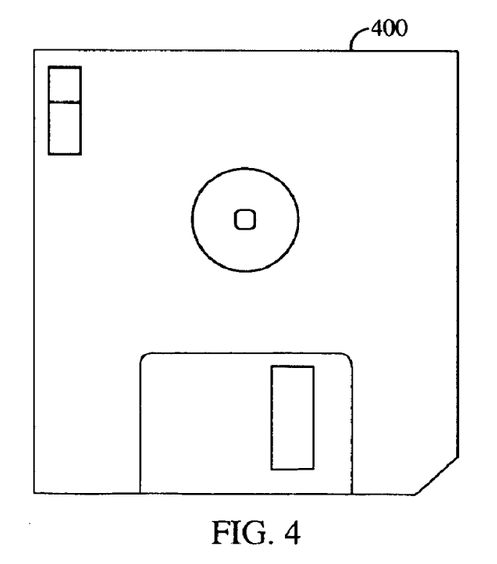
FIG. 4 shows an exemplary signal-bearing medium.
Figure 5:
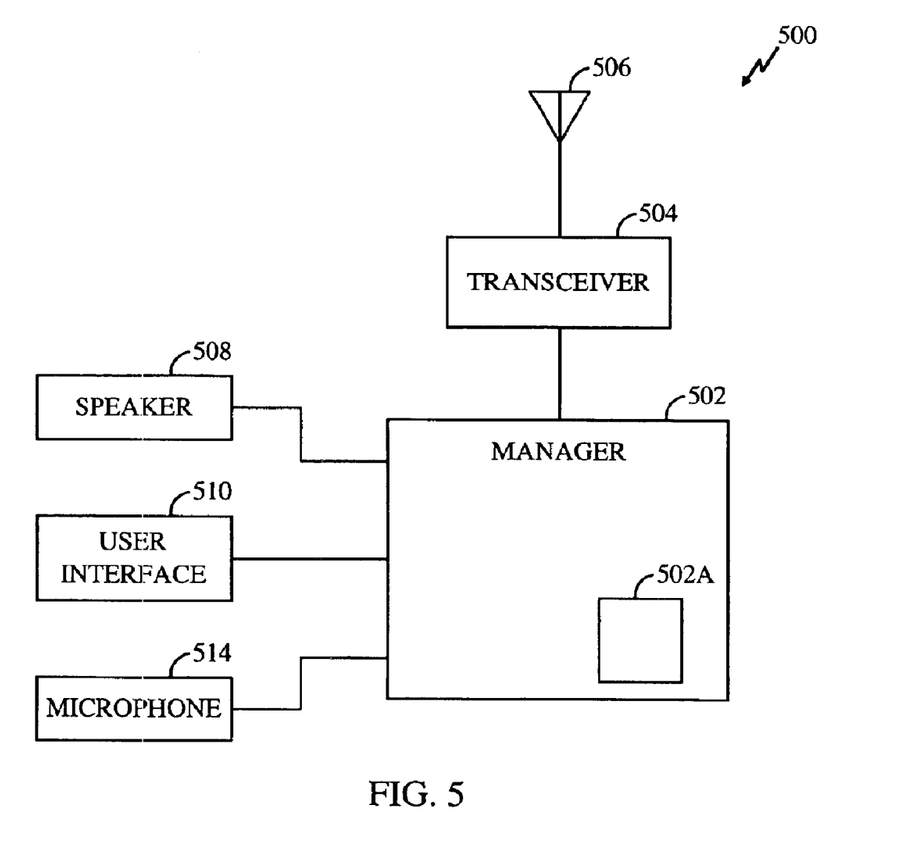
FIG. 5 shows an exemplary wireless telephone.

In one exemplary application, the voice recognition system 200 may be implemented in a wireless telephone 500 (FIG. 5), along with other circuitry known in the art of wireless telephony. The telephone 500 includes a speaker 508, user interface 510, microphone 514, transceiver 504, antenna 506, and manager 502. The manger 502, which may be implemented by circuitry such as that discussed above in conjunction with FIGS. 3–4, manages operation and signal routing between the components 504, 508, 510, and 514. The manager 502 includes a voice recognition module 502a, embodied by the system 200, and serving to perform a function such a decoding speech commands of a human operator of the telephone 500 regarding dialing, call management, etc.

Operation

Having described the structural features of the present invention, the operational aspect of the present invention will now be described. Unlike conventional approaches, which seek compactness and simplicity of operation by removing redundant features of input speech prior to analysis, the present invention purposefully analyzes redundant features of a source signal in order to perform voice recognition accurately in a variety of acoustic environments.

Signal-Bearing Media

Wherever the functionality of the invention is implemented using one or more machine-executed program sequences, these sequences may be embodied in various forms of signal-bearing media. In the context of FIG. 3, such a signal-bearing media may comprise, for example, the storage 304 or another signal-bearing media, such as a magnetic data storage diskette 400 (FIG. 4), directly or indirectly accessible by a processor 302. Whether contained in the storage 306, diskette 400, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the invention's functionality may be implemented using logic circuitry, instead of using instruction processing machines. Such logic circuitry is therefore configured to perform operations to carry out the method of the invention. The logic circuitry may be implemented using many different types of circuitry, as discussed above.

Overall Sequence of Operation

Figure 6:
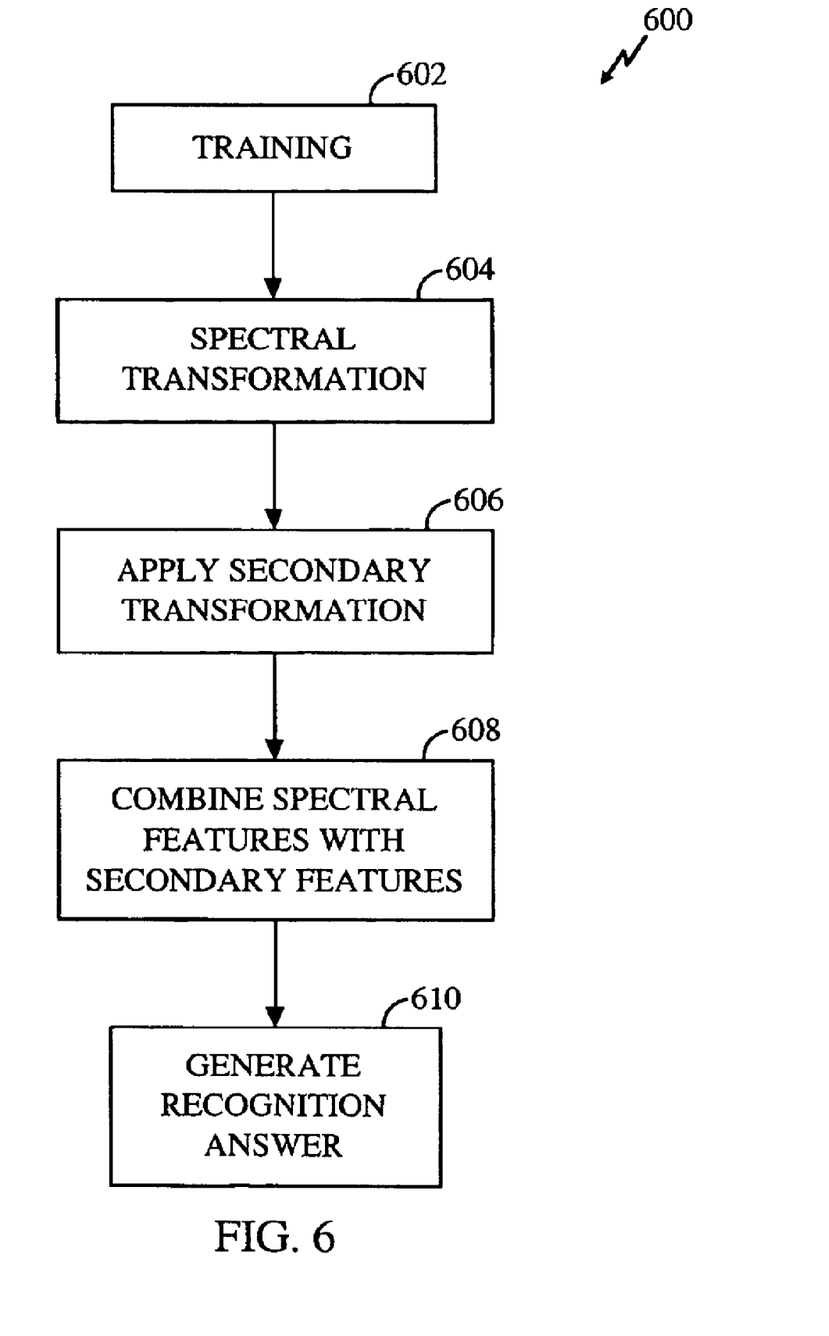
FIG. 6 is a flowchart of an operational sequence for voice recognition utilizing redundant features of speech.

FIG. 6 shows a sequence 600 to illustrate an exemplary voice recognition process. Broadly, this sequence serves to process digitized speech signals by analyzing redundant features to provide more noise robust voice recognition. For ease of explanation, but without any intended limitation, the example of FIG. 6 is described in the context of the voice recognition system 200 described above.

The sequence is initiated in step 602, where training of the system 200 is conducted. In the training step 602, an input speech signal 201 ("training speech") of desired characteristics is fed to the spectral feature extractor 202, and steps 604, 606, 608 (discussed below) are performed utilizing this input speech signal. For instance, the training speech may comprise model speech (for a speaker independent system) or a particular person's sample speech (for a speaker dependent system). Output of the feature combination module 206 forms a voice recognition template, which is associated with the training speech by preparing a training input 208a (signifying the content of the training speech), supplying the input 208a to the statistical modeling engine 208, and instructing the engine 208 to generate the desired recognition answer in the future whenever the system 200 encounters speech similar to the training speech. For instance, if the training speech signal 201 comprises the word "lesson," then the text "lesson" is fed to the engine 208 in association with the training speech signal 201. Further discussion of training is available from many sources, as many different techniques for training voice recognition systems are well known in the art. Some exemplary training schemes are discussed in the following materials, each incorporated herein by reference in its entirety: (1) U.S. patent application Ser. No. 09/248,513 entitled "Voice Recognition Rejection Scheme," filed Feb. 8, 1999, (2) U.S. patent application Ser. No. 09/255,891 entitled "System and Method for Segmentation and Recognition of Speech Signals," filed Jan. 4, 1999, and (3) U.S. patent application Ser. No. 09/615,572 entitled "Method and Apparatus for Constructing Voice Templates for a Speaker-independent Voice Recognition System," filed Jul. 13, 2000. Additional training may be conducted at later times (not shown), as required or desired.

After some training 602 is concluded, a non-training input speech signal 201 is input to the spectral feature extractor 202 (step 604). This signal 201 is that for which voice recognition is desired. Also in step 604, the extractor 202 performs a spectral transformation upon the input speech signal 201, which extracts spectral features from the input speech signal 201 and provides the extracted spectral features as the output 202a. One exemplary spectral extraction technique includes linear predictive coding (LPC), which is described in U.S. Pat. No. 5,414,796, entitled "Variable Rate Encoder," fully incorporated herein by reference, and the above-cited reference of Rabiner et al., *Digital Processing of Speech Signals*.

In step 606, the secondary transformation module 204 applies its secondary transformation to the spectral output 202a. In the illustrated example, the module 204 applies a cepstral transformation to the output 202a. Optionally, step 606 may also perform one or more additional secondary transformations (ceptstral or other types) in parallel with the illustrated transformation 204. As mentioned above, all secondary transformations are statistically dependent on the spectral transformation of step 604, meaning that that there is some common information carried by outputs 202a and 204b.

In step 608, the module 206 combines the spectral output 202a with the secondary output(s) 204a from the module 204 and any other modules of secondary transformation, if implemented. For ease of discussion, the present example is limited to the case where a single secondary transformation is used. As mentioned above, the combination of step 608 may occur in various ways. For instance, the module 206 may combine the signals 202a, 204a by concatenation, LDA, PCT, or another function. In a different embodiment, the processing subcomponents 206a, 206b first modify one or more of the signals 202a, 204a separately, after which the module 206 combines the modified signals. Each subcomponent 206a, 206b may perform a function such as scaling (i.e., multiplying) the input signal by a fixed or variable coefficient, changing the exponent of the input signal, multiplying the input signal by itself one or more times, or another one or more nonlinear or linear processes. In this embodiment, the signals as modified by 206a, 206b are then combined by one of the foregoing techniques, e.g., concatenation, LDA, PCT, etc.

In step 610, the statistical modeling engine 208 generates a recognition answer, representing the estimated content of the input speech signal 201. Step 610 is performed by pattern matching the signal from the module 206 against the predetermined set of voice recognition templates that were prepared in step 602.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method of processing speech signals comprising:
   applying a primary transformation to a digital input speech signal to extract primary features therefrom;
   applying each of at least one secondary transformation to one of the input speech signal and the primary features to yield secondary features statistically dependant on the primary features;
   applying at least one predetermined function to form a combined signal comprising a combination of the primary features with the secondary features; and
   generating a recognition answer by pattern matching the combined signal against predetermined voice recognition templates,
   the at least one predetermined function utilizing at least one of linear discriminant analysis, principal component transfer, and concatenation.

2. The method of claim 1, where the primary transformation comprises a spectral transformation.

3. The method of claim 1, where the primary transformation comprises production of a time-frequency representation of the input speech signal.

4. The method of claim 1, where the primary transformation comprises a spectral transformation and the secondary transformation comprises a cepstral transformation.

5. The method of claim 1, further comprising:
   forming voice recognition templates by performing each of the applying and generating operations to predetermined training signals.

6. The method of claim 5, further comprising:
   forming the voice recognition templates by performing each of the applying and generating operations to predetermined training signals.

7. A method of processing speech signals comprising:
   applying a primary transformation to a digital input speech signal to extract primary features therefrom;
   applying each of at least one secondary transformation to one of the input speech signal and the primary features to yield secondary features statistically dependant on the primary features;
   applying at least one predetermined function to form a combined signal comprising a combination of the primary features with the secondary features; and
   generating a recognition answer by pattern matching the combined signal against predetermined voice recognition templates,
   where the at least one predetermined function
      utilizes at least one of linear discriminant analysis, principal component transfer, and concatenation; and
      separately modifies at least one of the primary features and the secondary features, the at least one predetermined function being used to form a combined signal comprising a combination of the primary features including any modifications with the secondary features including any modifications.

8. The method of claim 7, where each of the separately modifying operations comprises at least one of the following:
   scaling, power change, self-multiplying, exponentiation.

9. The method of claim 7, where the primary transformation comprises a spectral transformation.

10. The method of claim 7, where the primary transformation comprises production of a time-frequency representation of the input speech signal.

11. The method of claim 7, where the primary transformation comprises a spectral transformation and the secondary transformation comprises a cepstral transformation.

12. A signal-bearing medium tangibly embodying a program of machine-readable instructions executable by a digital processing apparatus to perform operations for processing speech signals, the operations comprising:

applying a primary transformation to a digital input speech signal to extract primary features therefrom;

applying each of at least one secondary transformation to one of the input speech signal and the primary features to yield secondary features statistically dependent on the primary features;

applying at least one predetermined function to form a combined signal comprising a combination of the primary features with the secondary features; and generating a recognition answer by pattern matching the combined signal against predetermined voice recognition templates, the at least one predetermined function utilizing at least one of linear discriminant analysis, principal component transfer, and concatenation.

13. The medium of claim 12, where the primary transformation comprises a spectral transformation.

14. The medium of claim 12, where the primary transformation comprises production of a time-frequency representation of the input speech signal.

15. The medium of claim 12 where the primary transformation comprises a spectral transformation and the secondary transformation comprises a cepstral transformation.

16. The medium of claim 12, further comprising:

forming the voice recognition templates by performing each of the applying and generating operations to predetermined training signals.

17. A signal-bearing medium tangibly embodying a program of machine-readable instructions executable by a digital processing apparatus to perform operations for processing speech signals, the operations comprising:

applying a primary transformation to a digital input speech signal to extract primary features therefrom;

applying each of at least one secondary transformation to one of the input speech signal and the primary features to yield secondary features statistically dependent on the primary features;

applying at least one predetermined function to form a combined signal comprising a combination of the primary features with the secondary features; and generating a recognition answer by pattern matching the combined signal against predetermined voice recognition templates;

where the at least one predetermined function
utilizes at least one of linear discriminant analysis, principal component transfer, and concatenation; and
separately modifies at least one of the primary features and the secondary features, the at least one predetermined function being used to form a combined signal comprising a combination of the primary features including any modifications with the secondary features including any modifications.

18. The medium of claim 17, where each of the separately modifying operations comprises at least one of the following:

scaling, power change, self-multiplication, exponentiation.

19. The medium of claim 17, where the primary transformation comprises a spectral transformation.

20. The medium of claim 17, where the primary transformation comprises production of a time-frequency representation of the input speech signal.

21. The medium of claim 17 where the primary transformation comprises a spectral transformation and the secondary transformation comprises a cepstral transformation.

22. The medium of claim 17, further comprising forming the voice recognition templates by performing each of the applying and generating operations to predetermined training signals.

23. Circuitry of multiple interconnected electrically conductive elements configured to perform operations to process speech signals, the operations comprising:

applying a primary transformation to a digital input speech signal to extract primary features therefrom;

applying each of at least one secondary transformation to one of the input speech signal and the primary features to yield secondary features statistically dependant on the primary features;

applying at least one predetermined function to form a combined signal comprising a combination of the primary features with the secondary features; and generating a recognition answer by pattern matching the combined signal against predetermined voice recognition templates, the at least one predetermined function utilizing at least one of linear discriminant analysis, principal component transfer, and concatenation.

24. The circuitry of claim 23, where the primary transformation comprises a spectral transformation.

25. The circuitry of claim 23, where the primary transformation comprises production of a time-frequency representation of the input speech signal.

26. The circuitry of claim 23, where the primary transformation comprises a spectral transformation and the secondary transformation comprises a cepstral transformation.

27. The circuitry of claim 23, further comprising:

forming the voice recognition templates by performing each of the applying and generating operations to predetermined training signals.

28. Circuitry of multiple interconnected electrically conductive elements configured to perform operations to process speech signals, the operations comprising:

applying a primary transformation to a digital input speech signal to extract primary features therefrom;

applying each of at least one secondary transformation to one of the input speech signal and the primary features to yield secondary features statistically dependant on the primary features;

applying at least one predetermined function to form a combined signal comprising a combination of the primary features with the secondary features;

generating a recognition answer by pattern matching the combined signal against predetermined voice recognition templates; and where the at least one predetermined function
utilizes at least one of linear discriminant analysis, principal component transfer, and concatenation; and
separately modifies at least one of the primary features and the secondary features, the at least one predetermined function being used to form a combined signal comprising a combination of the primary features including any modifications with the secondary features including any modifications.

29. The circuitry of claim 28, where each of the separately modifying operations comprises at least one of the following:

scaling, power change, self-multiplication, exponentiation.

30. The circuitry of claim 28, where the primary transformation comprises a spectral transformation.

31. The circuitry of claim 28, where the primary transformation comprises production of a time-frequency representation of the input speech signal.

32. The circuitry of claim 28, where the primary transformation comprises a spectral transformation and the secondary transformation comprises a cepstral transformation.

33. The circuitry of claim 28, further comprising forming tire voice recognition templates by performing each of the applying and generating operations to predetermined training signals.

34. A voice recognition system comprising:
- a primary feature extractor applying a primary function to extract primary features from a digital input speech signal;
- at least one secondary transformation module each producing secondary features statistically dependent on the primary features by applying a secondary function to an input comprising one of the following: the input speech signal, the primary features;
- a feature combination module coupled to the primary feature extractor and each of the secondary transformation modules to apply one or more predetermined functions to combine the primary features with the secondary features forming a combined signal; and
- a statistical modeling engine, coupled to the feature combination module to generate a recognition answer by pattern matching the combined signal against predetermined voice recognition templates,
- the at least one predetermined function utilizing at least one of linear discriminant analysis, principal component transfer, and concatenation.

35. A voice recognition system comprising:
- primary feature extractor means for applying a primary function to extract primary features from a digital input speech signal;
- secondary transformation means for producing secondary features statistically dependent on the primary features by applying at least one secondary function to an input comprising one of the following: the input speech signal, the primary features;
- feature combination means for applying one or more predetermined functions to combine the primary features with the secondary features forming a combined signal; and
- statistical modeling means for generating a recognition answer by pattern matching the combined features against predetermined voice recognition templates,
- the at least one predetermined function utilizing at least one of linear disriminant analysis, principal component transfer, and concatenation.

36. A wireless communications device having:
- a transceiver coupled to an antenna;
- a speaker;
- a microphone;
- a user interface;
- a manager coupled to components including the transceiver, speaker, microphone, and user interface to manage operation of the components, the manager including a voice recognition system configured to perform operations comprising:
- applying a primary transformation to a digital input speech signal to extract primary features therefrom;
- applying each of at least one secondary transformation to one of the input speech signal and the primary features to yield secondary features statistically dependant on the primary features;
- applying at least one predetermined function to form a combined signal comprising a combination of the primary features with the secondary features; and
- generating a recognition answer by pattern matching the combined signal against predetermined voice recognition templates,
- the at least one predetermined function utilizing at least one of linear discriminant analysis, principal component transfer, and concatenation.

37. A wireless communications device having:
- a transceiver coupled to an antenna,
- a speaker;
- a microphone;
- a user interface;
- means for managing operation of the transceiver, speaker, microphone, and user interface, and for performing voice recognition by:
  - applying a primary transformation to a digital input speech signal to extract primary features therefrom;
  - applying each of at least one secondary transformation to one of the input speech signal and the primary features to yield secondary features statistically dependant on the primary features;
  - applying at least one predetermined function to form a combined signal comprising a combination of the primary features with the secondary features; and
  - generating a recognition answer by pattern matching the combined signal against predetermined voice recognition templates,
- the at least one predetermined function utilizing at least one of linear discriminant analysis, principal component transfer, and concatenation.

38. A voice recognition system comprising:
- a primary feature extractor applying a primary function to extract primary features from a digital input speech signal;
- at least one secondary transformation module each producing secondary features statistically dependent on the primary features by applying a secondary function to an input comprising one of the following: the input speech signal, the primary features;
- a feature combination module coupled to the primary feature extractor and each of the secondary transformation modules to apply one or more predetermined functions to combine the primary features with the secondary features fanning a combined signal;
- a statistical modeling engine, coupled to the feature combination module to generate a recognition answer by pattern matching the combined signal against predetermined voice recognition templates;
- the predetermined function utilizing at least one of the following to combine the primary features and the secondary features: linear disriminant analysis, principal component transfer, concatenation;
- applying a primary transformation to a digital input speech signal to extract primary features therefrom;
- applying each of at least one secondary transformation to one of the input speech signal and the primary features to yield secondary features statistically dependant on the primary features;
- applying at least one predetermined function to form a combined signal comprising a combination of the primary features with the secondary features; and
- generating a recognition answer by pattern matching the combined signal against predetermined voice recognition templates,
- where the at least one predetermined function
  - utilizes at least one of linear discriminant analysis, principal component transfer, and concatenation; and
  - separately modifies at least one of the primary features and the secondary features, the at least one predetermined function being used to form a combined signal comprising a combination of the primary features including any modifications with the secondary features including any modifications.

39. A voice recognition system comprising:

primary feature extractor means for applying a primary function to extract primary features front a digital input speech signal;

secondary transformation means for producing secondary features statistically dependent on the primary features by applying at least one secondary function to an input comprising one of the following: the input speech signal, the primary features;

feature combination means for applying one or more predetermined functions to combine the primary features with the secondary features forming a combined signal;

statistical modeling means for generating a recognition answer by pattern matching the combined features against predetermined voice recognition templates;

applying a primary transformation to a digital input speech signal to extract primary features therefrom;

applying each of at least one secondary transformation to one of the input speech signal and the primary features to yield secondary features statistically dependant on the primary features;

applying at least one predetermined function to form a combined signal comprising a combination of the primary features with the secondary features; and generating a recognition answer by pattern matching the combined signal against predetermined voice recognition templates, where the at least one predetermined function
utilizes at least one of linear discriminant analysis, principal component transfer, and concatenation; and
separately modifies at least one of the primary features and the secondary features, the at least one predetermined function being used to form a combined signal comprising a combination of the primary features including any modifications with the secondary features including any modifications.

40. A wireless communications device having:

a transceiver coupled to an antenna;

a speaker;

a microphone;

a user interface;

a manager coupled to components including the transceiver, speaker, microphone, and the user interface to manage operation of the components, and a voice recognition system configured to perform operations comprising:

applying a primary transformation to a digital input speech signal to extract primary features therefrom;

applying each of at least one secondary transformation to one of the input speech signal and the primary features to yield secondary features statistically dependant on the primary features;

applying at least one predetermined function to form a combined signal comprising a combination of the primary features with the secondary features;

generating a recognition answer by pattern matching the combined signal against predetermined voice recognition templates;

applying a primary transformation to a digital input speech signal to extract primary features therefrom;

applying each of at least one secondary transformation to one of the input speech signal and the primary features to yield secondary features statistically dependant on the primary features;

applying at least one predetermined function to form a combined signal comprising a combination of the primary features with the secondary features; and generating a recognition answer by pattern matching the combined signal against predetermined voice recognition templates, where the at least one predetermined function
utilizes at least one of linear discriminant analysis, principal component transfer, and concatenation; and
separately modifies at least one of the primary features and the secondary features, the at least one predetermined function being used to form a combined signal comprising a combination of the primary features including any modifications with the secondary features including any modifications.

41. A wireless communications device having:

a transceiver coupled to an antenna;

a speaker;

a microphone;

a user interface;

means for managing operation of the transceiver, speaker, microphone, and user interface, and for performing voice recognition by:

applying a primary transformation to a digital input speech signal to extract primary features therefrom;

applying each of at least one secondary transformation to one of the input speech signal and the primary features to yield secondary features statistically dependant on the primary features;

applying at least one predetermined function to form a combined signal comprising a combination of the primary features with the secondary features;

generating a recognition answer by pattern matching the combined signal against predetermined voice recognition templates;

applying a primary transformation to a digital input speech signal to extract primary features therefrom;

applying each of at least one secondary transformation to one of the input speech signal and the primary features to yield secondary features statistically dependant on the primary features;

applying at least one predetermined function to form a combined signal comprising a combination of the primary features with the secondary features; and generating a recognition answer by pattern matching the combined signal against predetermined voice recognition templates;

where the at least one predetermined function
utilizes at least one of linear discriminant analysis, principal component transfer, and concatenation; and
separately modifies at least one of the primary features and the secondary features, the at least one predetermined function being used to form a combined signal comprising a combination of the primary features including any modifications with the secondary features including any modifications.

* * * * *